No. 757,329. Patented April 12, 1904.

UNITED STATES PATENT OFFICE.

MITFORD C. MASSIE, OF WASHINGTON, DISTRICT OF COLUMBIA, ADMINISTRATOR OF FRITZ ACH, DECEASED, ASSIGNOR TO C. F. BOEHRINGER & SOEHNE, OF MANNHEIM-WALDHOF, GERMANY, A FIRM.

PROCESS OF MAKING XANTHIN DERIVATIVES.

SPECIFICATION forming part of Letters Patent No. 757,329, dated April 12, 1904.

Application filed February 7, 1903. Serial No. 142,590. (No specimens.)

*To all whom it may concern:*

Be it known that FRITZ ACH, deceased, late a citizen of Germany, and a resident of Mannheim, Germany, did invent new and useful Improvements in the Preparation of Xanthin Derivatives; and I, MITFORD C. MASSIE, the duly-constituted administrator of the estate of said FRITZ ACH, deceased, do hereby declare the following to be a full, clear, and exact description of the said invention of said decedent, such as will enable others skilled in the art to which it appertains to make and use the same.

This invention relates to the art of preparing xanthins or xanthin derivatives, such as caffein, theobromin; and the object of the same is to utilize the alkyl-xanthin derivatives having a methyl group bound to the carbon atom at the position 8 according to the nomenclature adopted by Emil Fischer and explained, *e. g.*, in United States Patent No. 607,028, dated July 12, 1898.

In United States Patent No. 667,381, dated February 5, 1901, and in German Patent No. 128,212, issued February 8, 1902, is described a class of derivatives, or, more specifically, homologues of xanthin, which have bound to the carbon atom in the position 8 of the purin-ring a methyl group and which are therefore identified by the general structural formula:

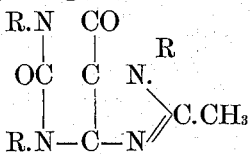

where R designates any alkyl radical. These compounds are readily obtainable from uric acid proper or a homologue of the same by causing acetic acid anhydrid to react thereon, as explained in detail in said United States patent.

The inventor has succeeded in devising a method by which the 8-methyl group may be removed or split off, whereby a convenient and profitable way is opened up to proceed synthetically from the uric-acid series to the valuable xanthin derivatives, such as theobromin, caffein, &c. This method is based on the property of 8-trichloroalkyl-xanthin, which constitutes a part of the subject-matter of this inventor's application, Serial No. 142,589, filed February 7, 1903, (Case G',) of releasing the CCl₃ group bound to the C atom in the position 8 when properly treated, thereby giving rise to a dechlorized xanthin derivative. If these trichloro derivatives are boiled with water for a sustained period of time, carbonic acid is evolved and hydrochloric acid formed, giving rise to the reaction expressed in the following equation:

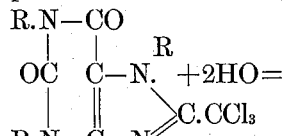

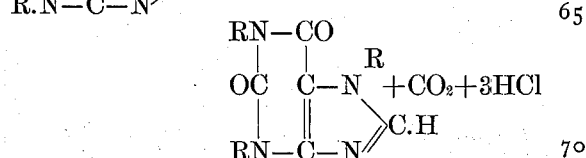

In this manner caffein may be obtained from 8-trichloromethyl-xanthin, and, generally speaking, all of the 8-trichloromethyl-xanthins thus far examined have reacted in this way—that is to say, have replaced the CCl₃ group by a hydrogen atom.

In order to make a full disclosure of this invention, the method of manufacturing and the properties of the starting materials employed in carrying out the invention will first be described and then will be given in detail a number of examples of what is considered the preferred manner of practicing the said invention.

*Example 1—Preparation of Theobromin from 8-Trichloromethyltheobromin.*

The starting material for this process, the 8-trichloromethyltheobromin, together with its method of production, is claimed in the aforesaid concurrent application for this inventor, Serial No. 142,589, (Case G'.) For the purpose of a disclosure this starting compound and its method of manufacture will now be described, though the said method of manufacture forms no part of the present invention or claims.

One hundred grams of 8-methyltheobromin are suspended in two thousand cubic centimeters of phosphorous oxychlorid, in which are dissolved one hundred and thirty grams of chlorin. This mixture is then constantly shaken or agitated for four hours at ordinary temperature. The chlorin is thereby caused to gradually disappear by combining with the theobromin derivative, and the greater portion of the suspended matter gradually goes into solution. The whole is thereupon placed on the filter to separate the small amount of unchanged methyltheobromin, and the filtrate is thereupon subjected to evaporation *in vacuo* sufficient to drive off the phosphorous oxychlorid and to leave the new resultant body, the 8-trichloromethyltheobromin or 3-7-dimethyl-8-trichloro-methyl-xanthin, as a residue which is purified by dissolving in acetic ether and crystallizing therefrom. The crystals thus obtained are in the form of shining prisms, which contain acetic ether of crystallization, said acetic ether being, however, readily and gradually dissipated when drying the crystals in the air. This new xanthin derivative melts at about 211° to 212° centigrade. The formation of the new body is indicated in the equations:

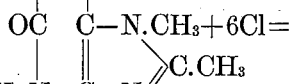

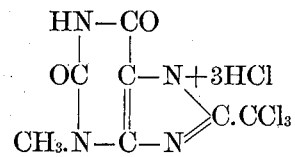

*Preparation of Theobromin.*—One part of this 8-trichloromethyltheobromin is dissolved in one hundred and thirty parts of hot water, and the solution thus formed is boiled in a reflux apparatus, which induces evolution and escape of carbon dioxid. After this evolution has ceased the liquid is concentrated somewhat (to about one-fourth of its bulk) and then allowed to cool. After cooling, theobromin cystallizes out of the solution and may be obtained in a pure condition by recrystallizing from water. The reaction taking place is indicated by the equation:

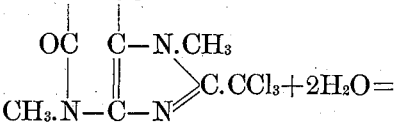

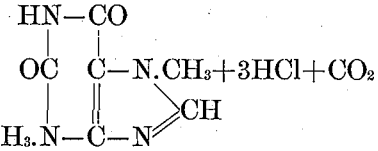

*Example 2—Preparation of Theophyllin from 8-Trichloromethyl-7-monochloromethyl-1, 3-dimethylxanthin.*

The starting product in this case is also a new compound which, together with the method of its manufacture, was invented by the inventor of this application, said method and its product being described and claimed in the aforesaid concurrent application, Serial No. 142,589. In order to give a full disclosure, the method of preparation of this new compound, though forming no part of the present invention, will now be described:

Tetramethyl-chloro-caffein or 8-trichloromethyl-7-monochloromethyl-1, 3-dimethylxanthin having the structural formula

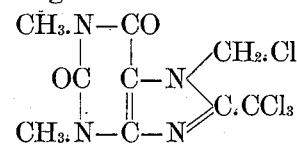

may be prepared by the following method: A solution of one part, by weight, of 8-methyl-caffein in about eight parts, by weight, of nitro-benzol is heated on a water-bath and into the so-heated solution a large excess of chlorin gas is introduced until no more of the same is absorbed. Thereupon the uncombined chlorin which remains dissolved in the nitro-benzol is expelled as far as possible by introducing or passing over the liquid a current of air, whereupon the greater portion of the nitro-benzol is distilled off from the whole in a vacuum. The residue is then allowed to cool, whereupon the new compound, the 8-trichloro-methyl-7-chloromethyl-1, 3-dimethyl-xanthin, is thrown out in the form of coarse crystals which are in a fairly pure condition without further treatment. For more complete purification they are redissolved in hot alcohol, from which they separate in the form of large colorless prismatic crystals which melt at about 204° to 205° centigrade. The new compound is readily soluble in chloroform, difficultly soluble in hot alcohol.

*Preparation of Theophyllin.*—If this 8-trichloro-methyl-7-monochloromethyl-1, 3-dimethyl-xanthin or tetrachloro-methyl-caffein be boiled with water, the group $CH_2Cl$ at the position 7 is split off similarly to the process described in United States Patent No. 660,744, dated October 30, 1900, and in German Patent No. 105,056, and at the same time the $CCl_3$ in position 8 is replaced by H, the reactions taking place according to the equation:

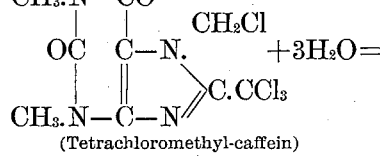
(Tetrachloromethyl-caffein)

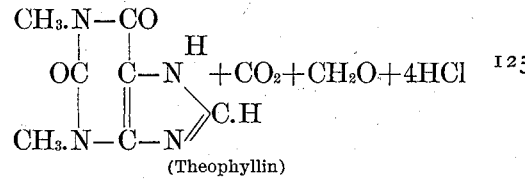
(Theophyllin)

Theophyllin is thus readily obtained. The process in detail is as follows: One hundred grams of the 8-trichloromethyl-7-monochloromethyl-1,3-dimethylxanthin or tetrachloromethylcaffein are boiled for a period of time. An intense odor of formic aldehyde will soon arise and the starting product gradually dissolves, while carbon dioxid escapes. The solution is then kept heated until the formaldehyde produced is removed as much as possible, whereupon the solution is concentrated to about one-fourth of its bulk by evaporation or the like. If, thereupon, the hydrochloric acid generated in the solution is partially neutralized until the solution reacts only weakly acid, the theophyllin will be thrown down in the form of snow-white needles. The yield is practically quantitative.

*Example 3—Preparation of Caffein from 8-Trichloromethyl-caffein.*

The starting compound in this case is 8-trichloromethyl-caffein, which, together with the process of preparing it, is described and claimed in the aforesaid application, Serial No. 142,589. Although the method of preparing the said trichloromethyl-caffein forms no part of the present invention, the same will now be described for purposes of a full disclosure.

*Preparation of 8-Trichloromethyl-caffein.*

(a) *By means of chlorin gas.*—Fifty-five grams of chlorin gas, corresponding to about three molecules, are introduced into a solution of fifty grams of dry 8-methyl-caffein in two hundred and fifty cubic centimeters of chloroform free from water, the said solution being constantly stirred during the introduction of the gas. The solution is then evaporated to dryness, whereby the trichloro compound is left as a residue. The reaction proceeds according to the equation:

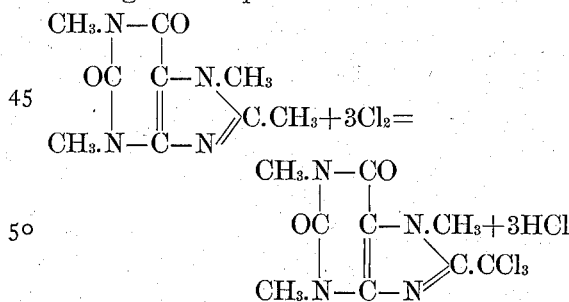

The residue is then purified by dissolving in acetic ether and crystallizing therefrom. The new compound is obtained in white needles having a melting-point of about 182° to 184° centigrade. Its formula is ascertained to be:

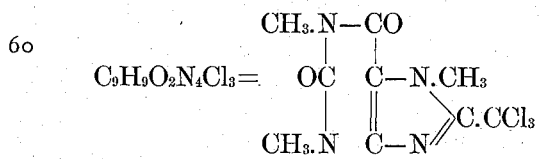

(b) *By means of sulfuryl-chlorid.*—Two hundred and seventy grams of sulfuryl-chlorid are poured or otherwise gradually introduced into a solution of one hundred grams of 8-methyl-caffein in five hundred cubic centimeters of chloroform, which solution is kept cool with ice and which is also constantly kept in motion while the sulfuryl-chlorid is introduced. After all of the sulfuryl-chlorid has been run in and the evolution of hydrochloric acid has ceased the chloroform is distilled off. The residual crude product, the 8-trichloromethyl-caffein, is purified in the manner described above.

*Preparation of caffein.*—One part, by weight, of 8-trichloromethyl-caffein is boiled for a period of time with about ten parts, by weight, of water. During this time the starting compound gradually goes into solution, carbon-dioxid gas coincidently escaping in large quantities. After cooling, the generated hydrochloric acid is partially neutralized until it reacts only slightly acid, whereupon the caffein is precipitated out of the solution.

It will be observed that in all of the examples given in illustration of this invention the process, considered in its broader aspects, is a hydrolysis of an 8-chloroalkyl-xanthin, and, more specifically, that it consists in submitting an 8-trichloro-methyl-xanthin to hydrolysis for the purpose of obtaining a xanthin derivative or homologue of xanthin, such as theobromin, theophyllin, or caffein.

What is claimed, and desired to be secured by Letters Patent of the United States, is—

1. The process of making xanthin derivatives which consists in submitting an 8-chloroalkyl xanthin to hydrolysis.

2. The process of making xanthin derivatives which consists in submitting an 8-chloromethyl xanthin to hydrolysis.

3. The process of making xanthin derivatives which consists in submitting an 8-trichloro-methyl xanthin to hydrolysis.

4. The process which consists in heating an 8-chloro-alkyl xanthin with water.

5. The process which consists in heating an 8-chloro-alkyl xanthin with water and concentrating the resultant solution.

6. The process which consists in heating an 8-chloro-alkyl xanthin with water and concentrating the resultant solution, and, finally, partly neutralizing the hydrochloric acid contained in the solution until the solution reacts slightly acid.

7. The process which consists in heating an 8-chloro-methyl xanthin with water.

8. The process which consists in heating an 8-chloro-methyl xanthin with water and concentrating the resultant solution.

9. The process which consists in heating an 8-chloro-methyl xanthin with water and concentrating the resultant solution, and, finally, partly neutralizing the hydrochloric acid contained in the solution until the solution reacts slightly acid.

10. The process which consists in boiling an 8-trichloro-methyl xanthin with water.

11. The process which consists in boiling an 8-trichloro-methyl xanthin with water and concentrating the resulting solution.

12. The process which consists in heating an 8-trichloro-alkyl xanthin with water until solution is effected, and, finally, partly neutralizing the hydrochloric acid contained in the solution until a weak acid reaction takes place.

13. The process which consists in heating an 8-trichloro-methyl xanthin with water until solution is effected and, finally, partly neutralizing the solution to weak acid reaction.

14. The process which consists in boiling an 8-trichloro-methyl xanthin with water until solution is effected, then condensing the solution, and, finally, partly neutralizing the solution to slight acid reaction.

15. The process which consists in boiling an 8-trichloro-methyl xanthin with water until solution is effected, then condensing the solution, and cooling, and, finally, partly neutralizing the solution to slight acid reaction.

16. The process which consists in boiling an 8-trichloro-methyl xanthin containing the group $CH_2Cl$ in the position 7 with water until solution is effected, then further heating the solution until the formaldehyde has substantially all escaped.

17. The process which consists in boiling an 8-trichloro-methyl xanthin containing the group $CH_2Cl$ in the position 7 with water until solution is effected, then further heating the solution until the formaldehyde has substantially all escaped, then condensing the solution, and, finally, partly neutralizing the solution to slight acid reaction.

18. The process which consists in boiling an 8-trichloro-methyl xanthin containing the group $CH_2Cl$ in the position 7 with water until solution is effected, then further heating the solution until the formaldehyde has substantially all escaped, then condensing the solution, and cooling, and, finally, partly neutralizing the solution to slight acid reaction.

In testimony whereof I affix my signature in presence of two witnesses.

MITFORD C. MASSIE,
*Administrator of the estate of Fritz Ach, deceased.*

Witnesses:
ALBANUS S. T. JOHNSON,
ANTON GLOETZNER.